United States Patent
Yeom

(10) Patent No.: US 12,433,441 B2
(45) Date of Patent: Oct. 7, 2025

(54) COOKING DEVICE

(71) Applicant: CUCHEN CO., LTD, Seoul (KR)

(72) Inventor: Kyu Hyun Yeom, Chungcheongnam-do (KR)

(73) Assignee: CUCHEN CO., LTD, Seoul (KR)

( * ) Notice: Subject to any disclaimer, the term of this patent is extended or adjusted under 35 U.S.C. 154(b) by 0 days.

(21) Appl. No.: 18/567,370

(22) PCT Filed: Jun. 14, 2022

(86) PCT No.: PCT/KR2022/008408
§ 371 (c)(1),
(2) Date: Dec. 6, 2023

(87) PCT Pub. No.: WO2022/265359
PCT Pub. Date: Dec. 22, 2022

(65) Prior Publication Data
US 2024/0260777 A1    Aug. 8, 2024

(30) Foreign Application Priority Data

Jun. 14, 2021 (KR) .......................... 10-2021-0077032

(51) Int. Cl.
*A47J 27/08* (2006.01)
*A47J 27/04* (2006.01)

(52) U.S. Cl.
CPC .......... *A47J 27/0804* (2013.01); *A47J 27/04* (2013.01); *A47J 2027/043* (2013.01)

(58) Field of Classification Search
CPC .................. A47J 27/04; A47J 2027/043
See application file for complete search history.

(56) References Cited

U.S. PATENT DOCUMENTS

| | | | |
|---|---|---|---|
| 3,677,434 | A | * 7/1972 | Boyer |
| 2013/0199633 | A1 | 8/2013 | Hasegawa |
| 2021/0007532 | A1 | 1/2021 | Park |

FOREIGN PATENT DOCUMENTS

| | | |
|---|---|---|
| CN | 1903105 A | 1/2007 |
| CN | 101554288 B | 2/2012 |

(Continued)

OTHER PUBLICATIONS

Machine translation of JP H11151160 A1 performed on May 8, 2024, Hueppi (Year: 1999).*

(Continued)

*Primary Examiner* — Brian W Jennison
*Assistant Examiner* — Kevin Guanhua Wen
(74) *Attorney, Agent, or Firm* — Nicholas Park

(57) ABSTRACT

A cooking device according to an exemplary embodiment of the present disclosure includes: a top plate covering an inner pot; and a steam discharge structure including a post including a steam discharge passage connected to interior of the inner pot, a moving member disposed on the post to surround at least a portion of a side surface of the post, and configured to move in a first direction which is perpendicular to a direction in which a top surface of the top plate extends, a steam blocking member disposed within the steam discharge passage through a portion of the moving member, and configured to open/close the steam discharge passage based on a movement of the steam blocking member in the first direction, and an elastic member configured to provide an elastic force to the steam blocking member based on a movement of the moving member in the first direction.

8 Claims, 11 Drawing Sheets

(56) References Cited

FOREIGN PATENT DOCUMENTS

| | | | |
|---|---|---|---|
| CN | 202234760 U1 * | 5/2012 | ............. A47J 27/08 |
| CN | 106923660 A1 * | 7/2017 | ............. A47J 27/09 |
| CN | 107536460 A | 1/2018 | |
| CN | 109497827 A1 * | 3/2019 | ......... A47J 27/0804 |
| CN | 212971502 U1 * | 4/2021 | ............. A23B 7/005 |
| JP | S53110859 A | 9/1978 | |
| JP | H11151160 A1 * | 6/1999 | ............. A47J 27/09 |
| JP | 2018-117989 A | 8/2018 | |
| JP | 2019-048041 A | 3/2019 | |
| JP | 6774883 B2 | 10/2020 | |
| KR | 10-2000-0075289 A | 12/2000 | |
| KR | 20110019281 A1 * | 2/2011 | ............ A47J 27/092 |
| KR | 20110008190 U1 * | 8/2011 | ............ A47J 27/086 |
| KR | 10-2012-0021402 A | 3/2012 | |
| KR | 20120007839 U1 * | 11/2012 | ............ A47J 27/092 |
| KR | 10-2014-0009738 A | 1/2014 | |
| KR | 10-1608417 B1 | 4/2016 | |
| KR | 10-2019-0027604 A | 3/2019 | |
| KR | 10-2020-0141329 A | 12/2020 | |
| KR | 10-2021-0050328 A | 5/2021 | |
| RU | 2479241 C2 | 4/2013 | |

OTHER PUBLICATIONS

Machine translation of KR 20120007839 U1 performed on May 8, 2024, Park et al. (Year: 2012).*
Machine translation of CN 109497827 A1 performed on May 9, 2024, Zhong et al. (Year: 2019).*
Machine translation of KR 20110008190 U1 performed on May 9, 2024, Park et al. (Year: 2011).*
Machine translation of KR 20110019281 A1 performed on May 9, 2024, Yu (Year: 2011).*
Machine translation of CN 202234760 U1 performed on May 9, 2024, Qiu et al. (Year: 2012).*
Machine translation of CN 106923660 A1 performed on Aug. 2, 2024, Liang et al. (Year: 2017).*
Machine translation of CN 212971502 U1 performed on May 2, 2025, Lou (Year: 2021).*
WIPO, International Search Report for International Application No. PCT/KR2022/008408, Aug. 31, 2022, 5 pages.
KIPO, Notice of Refusal to Grant a Patent for Application No. 10-2021-0077032, May 20, 2022, 7 pages.
KIPO, Amendment and Written opinion for Patent for Application No. 10-2021-0077032, Aug. 12, 2022, 27 pages.
KIPO, Decision to Grant a Patent for Korean Patent Application No. 10-2021-0077032, Nov. 30, 2022, 4 pages.

* cited by examiner

COOKING DEVICE

CROSS-REFERENCE TO RELATED APPLICATION

This application is the National Phase of PCT International Application No. PCT/KR2022/008408, filed on Jun. 14, 2022, which claims the benefit of Korean Application No. 10-2021-0077032 filed on Jun. 14, 2021, which is hereby incorporated by reference herein in their entirety.

TECHNICAL FIELD

The technical idea of the present disclosure relates to a cooking device in which the intensity of pressure in a cooking space of an inner pot is capable of being adjusted during cooking.

BACKGROUND

In a cooking device, food ingredients such as grains may be cooked by heating an inner pot in which food is accommodated to create a high-temperature and high-pressure state. During cooking using the cooking device, the pressure in a cooking space of the inner pot may be determined by a weight. Recently, research on cooking devices capable of implementing various tastes of rice has been actively conducted. In addition, in order to provide various tastes of rice, the pressure of the inner pot needs to be adjusted in various ways during cooking.

SUMMARY

One of the problems to be solved by the technical idea of the present disclosure is to provide a cooking device capable of cooking various types of food and implementing various tastes.

In view of the foregoing, an exemplary embodiment of the present disclosure provides a cooking device including: a top plate covering an inner pot; and a steam discharge structure including a post including a steam discharge passage connected to interior of the inner pot, a moving member disposed on the post to surround at least a portion of a side surface of the post, and configured to move in a first direction which is perpendicular to the direction in which the top surface of the top plate extends, a steam blocking member disposed within the steam discharge passage through a portion of the moving member, and configured to open/close the steam discharge passage based on a movement of the steam blocking member in the first direction, and an elastic member configured to provide an elastic force to the steam blocking member based on a movement of the moving member in the first direction.

In an exemplary embodiment, the moving member may be configured to move in the first direction based on rotation about a rotation axis extending in the first direction.

In an exemplary embodiment, the post may include a body extending in the first direction and including the steam discharge passage therein, and a rotating protrusion protruding in an oblique direction from a side surface of the body, wherein the moving member may include a receiving groove configured to receive the rotating protrusion.

In an exemplary embodiment, the steam blocking member may include a piston passing through the portion of the moving member, and a blocking cap coupled to a lower portion of the piston and configured to block the steam discharge passage, wherein the elastic member may be disposed between the moving member and the blocking cap to surround the piston.

In an exemplary embodiment, the cooking device may further include: a rotating cover coupled to the top plate to be rotatable along an edge of the top plate, and including a first guide hole spaced apart from a rotation center of the rotating cover by a first distance, and a second guide hole spaced apart from the rotation center by a second distance greater than the first distance; and a locking structure configured to be engaged with a flange of the inner pot based on a rotation of the rotating cover.

In an exemplary embodiment, the locking structure may include: a locking plate configured to move in a second direction parallel to the direction in which the top surface of the top plate extends and perpendicular to the first direction; a locking protrusion protruding from a surface of the locking plate and disposed inside the first guide hole and the second guide hole in the rotating cover; and a locking hook coupled to one side of the locking plate, wherein the locking hook is configured to be coupled to or separated from the flange of the inner pot based on the rotation of the rotating cover.

In an exemplary embodiment, when the locking protrusion is disposed inside the first guide hole, the locking hook is coupled to the flange of the inner pot, and when the locking protrusion is disposed inside the second guide hole, the locking hook may be separated from the flange of the inner pot.

In addition, an exemplary embodiment of the present disclosure provides a cooking device including: a top plate covering an inner pot; a steam discharge structure including a post including a steam discharge passage connected to interior of the inner pot and a rotating protrusion extending obliquely from a side surface thereof, a moving member disposed on the post to surround at least a portion of a side surface of the post, including a receiving groove configured to receive the rotating protrusion, and configured to move, based on a rotation of the moving member, in a first direction which is perpendicular to a direction in which a top surface of the top plate extends, a steam blocking member passing through a portion of the moving member, and configured to open/close the steam discharge passage based on a movement of the steam blocking member in the first direction, and an elastic member configured to provide an elastic force to the steam blocking member based on the movement of the moving member in the first direction; a rotating cover coupled onto the top plate to be rotatable along an edge of the top plate, and including a first guide hole spaced apart from a rotation center of the rotating cover by a first distance, and a second guide hole spaced apart from the rotation center by a second distance greater than the first distance; and a locking structure including a locking protrusion disposed inside the first guide hole and the second guide hole in the rotating cover, and configured to move in a second direction parallel to the direction in which the top surface of the top plate extends to be coupled to or separated from the inner pot based on a rotation of the rotating cover.

A cooking device according to an exemplary embodiment of the present disclosure may include a steam discharge structure which operates in one of a plurality of pressure modes. Since the intensity of pressure inside the inner pot of the cooking device may be determined variously depending on the operation of the steam discharge structure, the cooking device is capable of cooking various types of food and implementing various tastes of rice.

DETAILED DESCRIPTION

Figure 1:
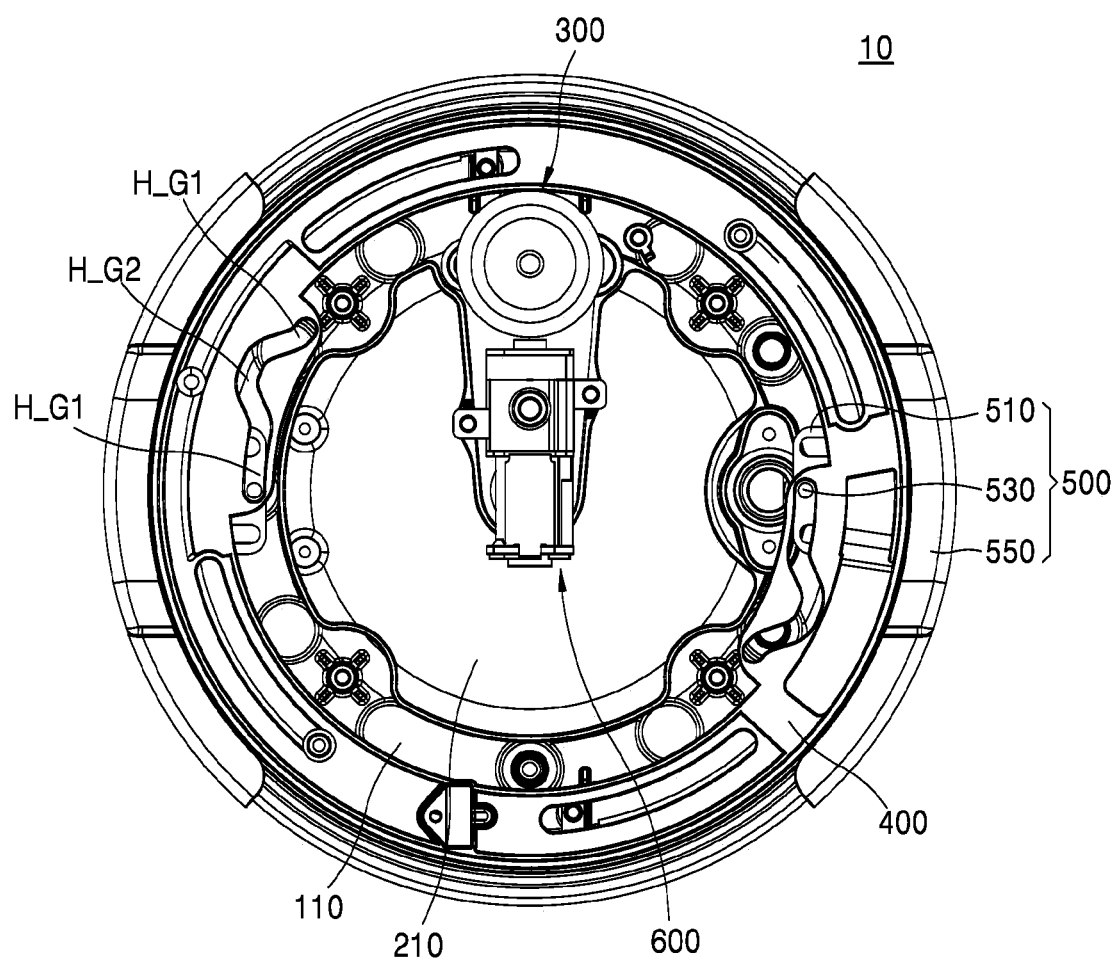
FIG. 1 is a plan view of a portion of a cooking device according to an exemplary embodiment of the present disclosure.

Hereinafter, embodiments of the present disclosure will be described in detail with reference to the accompanying drawings. However, the embodiments of the present disclosure may be modified in many different forms, and the scope of the present disclosure should not be construed as being limited due to the embodiments described below. It is desirable to interpret the embodiments of the present disclosure as being provided to more completely explain the present disclosure to those skilled in the art. The like reference numerals indicate like elements throughout the specification and drawings. Further, various elements and regions are schematically drawn in the drawings. Accordingly, the concepts of the present disclosure are not limited by the relative sizes or spacings drawn in the accompanying drawings.

Unless defined otherwise, all terms used herein, including technical terms and scientific terms, have the same meaning as commonly understood by a person of ordinary skill in the art to which the concept of the present disclosure pertains. It will be appreciated that commonly used terms, as defined in the dictionary, are to be interpreted as having a meaning consistent with what they mean in the context of the technology to which they relate, and that the terms are not to be interpreted in an overly formal sense unless explicitly defined herein.

Figure 2:
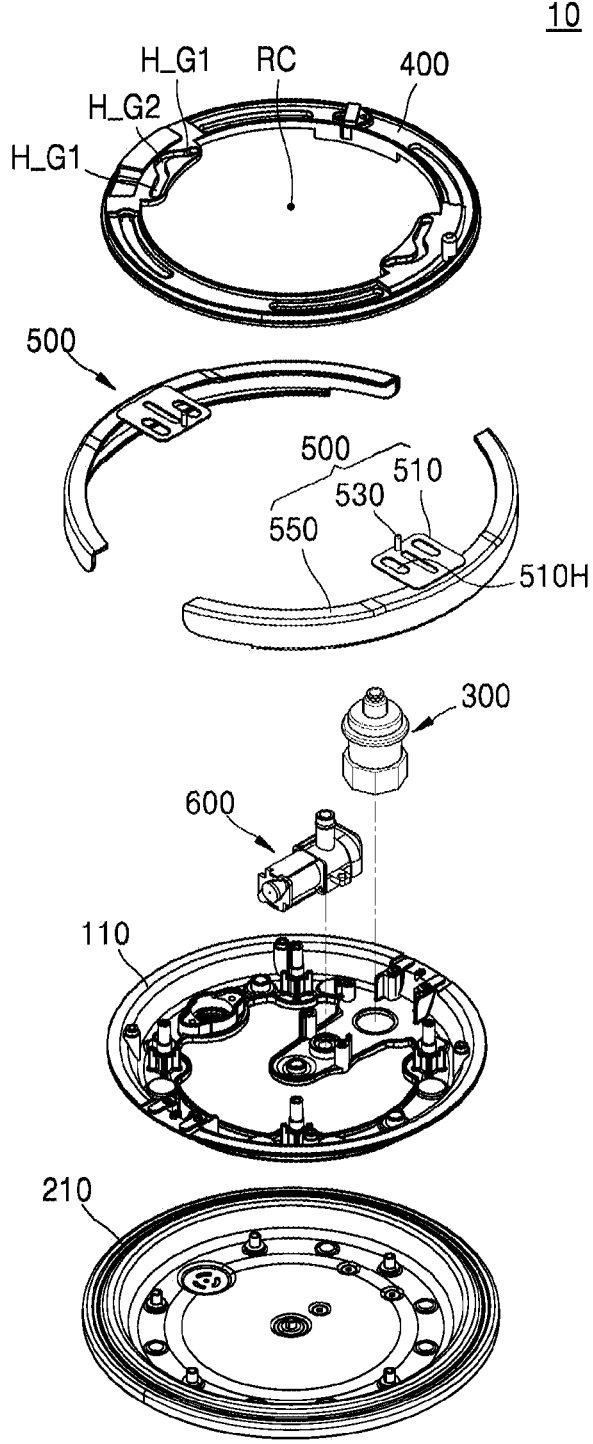
FIG. 2 is an exploded perspective view of a portion of the cooking device according to an exemplary embodiment of the present disclosure.

FIG. 1 is a plan view of a portion of a cooking device 10 according to an exemplary embodiment of the present disclosure, and FIG. 2 is an exploded perspective view of a portion of the cooking device 10 according to an exemplary embodiment of the present disclosure.

The cooking device 10 according to an exemplary embodiment of the present disclosure may control the intensity of pressure in the cooking space of an inner pot (2100 in FIG. 11) configured to accommodate food ingredients by setting a cooking mode. In an exemplary embodiment, when the cooking mode of the cooking device 10 is set, the intensity of pressure formed in the cooking space of the inner pot 2100 may be controlled by a user's manipulation of the steam discharge structure 300.

In an exemplary embodiment, the cooking device 10 may implement one of a first pressure mode, a second pressure mode, a third pressure mode, and a fourth pressure mode. The first to fourth pressure modes capable of being implemented by the cooking device 10 will be described in detail later.

Referring to FIGS. 1 and 2 together, the cooking device 10 according to an exemplary embodiment of the present disclosure may include a top plate 110, an inner pot cover 210, a steam discharge structure 300, a rotating cover 400, a locking structure 500, a solenoid valve 600, and the like.

The top plate 110 may be a plate that covers the top of the inner pot 2100. In addition, the top plate 110 may be a plate on which the steam discharge structure 300, the rotating cover 400, the locking structure 500, and the solenoid valve 600 are disposed. In addition, the top plate 110 may be provided in a disk shape when the top plate 110 is viewed from above.

The inner pot cover 210 may be a plate that is coupled to a lower portion of the top plate 110 and covers an upper portion of the inner pot 2100 (i.e., the cooking space of the inner pot 2100) during cooking. For example, the bottom surface of the inner pot cover 210 may come into contact with steam generated in the cooking space of the inner pot 2100 during cooking using the cooking device 10. In an exemplary embodiment, the inner pot cover 210 may be coupled to the lower portion of the top plate 110 to surround an edge of the top plate 110 when the cooking device 10 is viewed from above.

In addition, the inner pot cover 210 may have at the edge thereof a ring-shaped packing groove in which a packing is disposed. The packing coupled to the inner pot cover 210 may be provided in a ring shape. In addition, the packing may block steam generated in the cooking space of the inner pot 2100 during cooking from leaking out to the exterior. In an exemplary embodiment, the material of the packing may include a silicone rubber or synthetic rubber.

The steam discharge structure 300 may be configured to discharge steam generated in the cooking space of the inner pot 2100 during cooking to the exterior. In an exemplary embodiment, the steam discharge structure 300 may be configured to control a maximum pressure formed inside the inner pot 2100 during cooking.

For example, the steam discharge structure 300 may implement any one of the first to fourth pressure modes. When the steam discharge structure 300 operates in any one of the first to fourth pressure modes, the maximum pressure formed inside the inner pot 2100 during cooking may vary depending on each pressure mode.

As described above, the steam discharge structure 300 of the present disclosure is capable of implementing four pressure modes. However, without being limited thereto, the steam discharge structure 300 may implement two or more pressure modes.

In an exemplary embodiment, a portion of the steam discharge structure 300 may be held by a user. Accordingly, the steam discharge structure 300 may be operated by a user's manipulation.

For example, as will be described later, a portion of the steam discharge structure 300 may be exposed from an outer pot lid (1200 in FIG. 9), and a portion of the steam discharge structure 300 exposed from the outer pot lid 1200 may be held and manipulated by a user. The operation mechanism of the steam discharge structure 300 will be described later in detail.

In an exemplary embodiment, when the steam discharge structure 300 operates in the first pressure mode, the maximum pressure formed inside the inner pot 2100 during cooking may be a first pressure. For example, the first pressure may be about 2.1 kgf/cm². However, the intensity of the first pressure is not limited thereto.

When the pressure of the steam generated in the course of cooking process does not exceed the first pressure while the steam discharge structure 300 operates in the first pressure mode, the steam discharge structure 300 may not discharge the steam inside the inner pot 2100 to the exterior of the cooking device 10. In addition, when the pressure inside the inner pot 2100 exceeds the first pressure in the course of cooking, the steam discharge structure 300 may discharge the steam inside the inner pot 2100 to the exterior of the cooking device 10.

In an exemplary embodiment, when the steam discharge structure operates in the second pressure mode, the maximum pressure formed inside the inner pot 2100 during cooking may be a second pressure lower than the first pressure. For example, the second pressure may be about 1.5 kgf/cm². However, the intensity of the second pressure is not limited thereto.

When the pressure of the steam generated in the course of cooking process does not exceed the second pressure while the steam discharge structure 300 operates in the second pressure mode, the steam discharge structure 300 may not discharge the steam inside the inner pot 2100 to the exterior of the cooking device 10. In addition, when the pressure inside the inner pot 2100 exceeds the second pressure in the course of cooking, the steam discharge structure 300 may discharge the steam inside the inner pot 2100 to the exterior of the cooking device 10.

In an exemplary embodiment, when the steam discharge structure operates in the third pressure mode, the maximum pressure formed inside the inner pot 2100 during cooking may be a third pressure lower than the above-mentioned second pressure. For example, the third pressure may be about 1.2 kgf/cm². However, the intensity of the third pressure is not limited thereto.

When the pressure of the steam generated in the course of cooking process does not exceed the third pressure while the steam discharge structure 300 operates in the third pressure mode, the steam discharge structure 300 may not discharge the steam inside the inner pot 2100 to the exterior of the cooking device 10. In addition, when the pressure inside the inner pot 2100 exceeds the third pressure in the course of cooking, the steam discharge structure 300 may discharge the steam inside the inner pot 2100 to the exterior of the cooking device 10.

In an exemplary embodiment, when the steam discharge structure 300 operates in the fourth pressure mode, the steam discharge structure 300 may connect the cooking space inside the inner pot 2100 to an external space of the cooking device 10. Accordingly, the steam inside the inner pot 2100 may be discharged to the exterior of the cooking device 10 through the steam discharge structure 300.

In other words, when the steam discharge structure 300 operates in the fourth pressure mode, the cooking device 10 may cook food ingredients inside the cooking space of the inner pot 2100 in the atmospheric pressure state (i.e., a non-pressure mode). For example, the cooking device 10 may cook food ingredients inside the cooking space of the inner pot 2100 while maintaining the pressure in the cooking space at about 1.0 kgf/cm².

The rotating cover 400 may be coupled to the top plate 110 to rotate along the edge of the top plate 110. For example, the rotating cover 400 may be configured to rotate about a rotation axis perpendicular to the direction in which the top surface of the top plate 110 extends.

In addition, the rotating cover 400 may be provided in a ring shape to be coupled to an upper portion of the top plate 110. In an exemplary embodiment, when the rotating cover 400 is viewed from above, a virtual point where the rotation axis of the rotating cover 400 is located may be defined as a rotation center RC.

In an exemplary embodiment, the rotating cover 400 may include a first guide hole H_G1 spaced apart from the rotation center RC by a first distance, and a second guide hole H_G2 spaced apart from the rotation center RC by a second distance greater than the first distance. As will be described later, the first guide hole H_G1 and the second guide hole H_G2 of the rotating cover 400 may provide spaces in which a locking protrusion (guide protrusion) 530 of the locking structure 500 is disposed.

In an exemplary embodiment, when the locking protrusion 530 of the locking structure 500 is disposed in the first guide hole H_G1 of the rotating cover 400, the locking hook 550 of the locking structure 500 may be coupled with the inner pot cover 210. In addition, the locking hook 550 of the locking structure 500 may be coupled to the flange (2110 in FIG. 11) of the inner pot (2100 in FIG. 11) to block the cooking space of the inner pot 2100.

In an exemplary embodiment, when the locking protrusion 530 of the locking structure 500 is disposed in the second guide hole H_G2 of the rotating cover 400, the locking hook 550 of the locking structure 500 may be separated from the inner pot cover 210. In addition, the locking hook 550 of the locking structure 500 may be separated from the flange 2110 of the inner pot 2100 to open the cooking space of the inner pot 2100.

That is, based on the rotation of the rotating cover 400 about a rotation axis extending in a first direction, the locking structure 500 may slide in a second direction parallel to the direction in which the top surface of the top plate 110 extends and perpendicular to the first direction to be coupled to or separated from the inner pot cover 210.

The locking structure 500 may slide on the top surface of the top plate 110 to be coupled with or separated from the inner pot 2100 and the inner pot cover 210 which covers the inner pot 2100.

In an exemplary embodiment, two locking structures 500 may be provided. For example, when two locking structures 500 are provided, the two locking structures 500 may be arranged to be symmetrical to each other with respect to an imaginary line crossing the rotation center RC of the rotating cover 400.

In an exemplary embodiment, the locking structure 500 may include a locking plate 510, a locking protrusion 530, and a locking hook 550.

In an exemplary embodiment, the locking plate 510 may be a plate configured to slide in the second direction perpendicular to the first direction in which the rotation axis of the rotating cover 400 extends.

For example, the locking plate 510 may have a plate shape extending in the second direction. In addition, the locking plate 510 may include a locking guide hole 510H in which a locking guide member (910 in FIG. 10) to be described later is disposed and which extends in the second direction.

In an exemplary embodiment, the locking protrusion 530 protrudes in a vertical direction from the surface of the locking plate 510 to be disposed inside the first guide hole H_G1 and the second guide hole H_G2 of the rotating cover 400.

Based on the rotation of the rotating cover 400 about the rotation axis extending in the first direction, the locking protrusion 530 may be disposed inside one of the first guide hole H_G1 and the second guide hole H_G2.

For example, when the rotating cover 400 rotates such that the locking protrusion 530 relatively moves from the first guide hole H_G1 to the second guide hole H_G2, the locking plate 510 coupled with the locking protrusion 530 may slide in a direction away from the center of the inner pot 2100.

In addition, when the rotating cover 400 rotates such that the locking protrusion 530 relatively moves from the second guide hole H_G2 to the first guide hole H_G1, the locking plate 510 coupled with the locking protrusion 530 may slide in a direction toward the center of the inner pot 2100.

In an exemplary embodiment, the locking hook 550 may be coupled to one side of the locking plate 510, and may be coupled with or separated from the inner pot cover 210 based on the movement of the locking plate 510.

In an exemplary embodiment, the locking hook 550 may be provided in a shape corresponding to the shape of the edge portion of the inner pot cover 210. For example, when the inner pot cover 210 has a disk shape when the inner pot cover 210 and the locking hook 550 are viewed from above, the locking hook 550 coupled to the edge of the inner pot cover 210 may be provided in an arc shape.

In an exemplary embodiment, when the locking protrusion 530 of the locking structure 500 is disposed inside the first guide hole H_G1 of the rotating cover 400, the locking hook 550 may be coupled with the edge of the inner pot cover 210.

In addition, when the locking protrusion 530 of the locking structure 500 is disposed inside the second guide hole H_G2 of the rotating cover 400, the locking hook 550 may be separated from the edge of the inner pot cover 210.

In an exemplary embodiment, the locking guide member (910 in FIG. 10) may be coupled to the top plate 110 to be disposed inside the locking guide hole 510H in the locking plate 510. The locking guide member 910 may be coupled to the top plate 110 and may be configured to guide the sliding movement of the locking plate 510 in the second direction. For example, the locking guide member 910 may include a fastening member such as a bolt fastened to the top plate 110.

The solenoid valve 600 may be disposed on the top plate 110 and may open/close a passage through which steam moves in the cooking space of the inner pot 2100 based on an electrical signal. In an exemplary embodiment, during cooking using the cooking device 10, at least one of the steam discharge structure 300 and the solenoid valve 600 may operate.

For example, during cooking using the cooking device 10, only one of the steam discharge structure 300 and the solenoid valve 600 may operate. However, the present disclosure is not limited thereto, and both the steam discharge structure 300 and the solenoid valve 600 may operate during cooking using the cooking device 10.

The cooking device 10 according to an exemplary embodiment of the present disclosure may include the steam discharge structure 300 operating in one of the plurality of pressure modes. Since the pressure inside the inner pot 2100 of the cooking device 10 can be determined by a user's manipulation of the steam discharge structure 300, the cooking device 10 is capable of cooking various types of food and implementing various tastes of rice.

Figure 3:
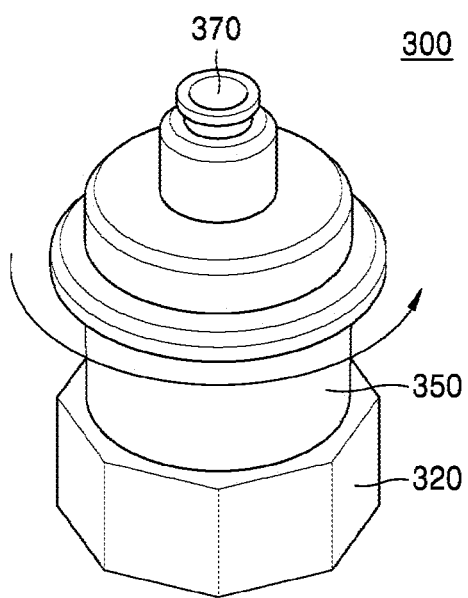
FIG. 3 is a perspective view of a steam discharge structure according to an exemplary embodiment of the present disclosure.

FIG. 3 is a perspective view of the steam discharge structure 300 according to an exemplary embodiment of the present disclosure. In addition, FIG. 4 is a cross-sectional view of the steam discharge structure 300 according to an exemplary embodiment of the present disclosure.

Figure 4:
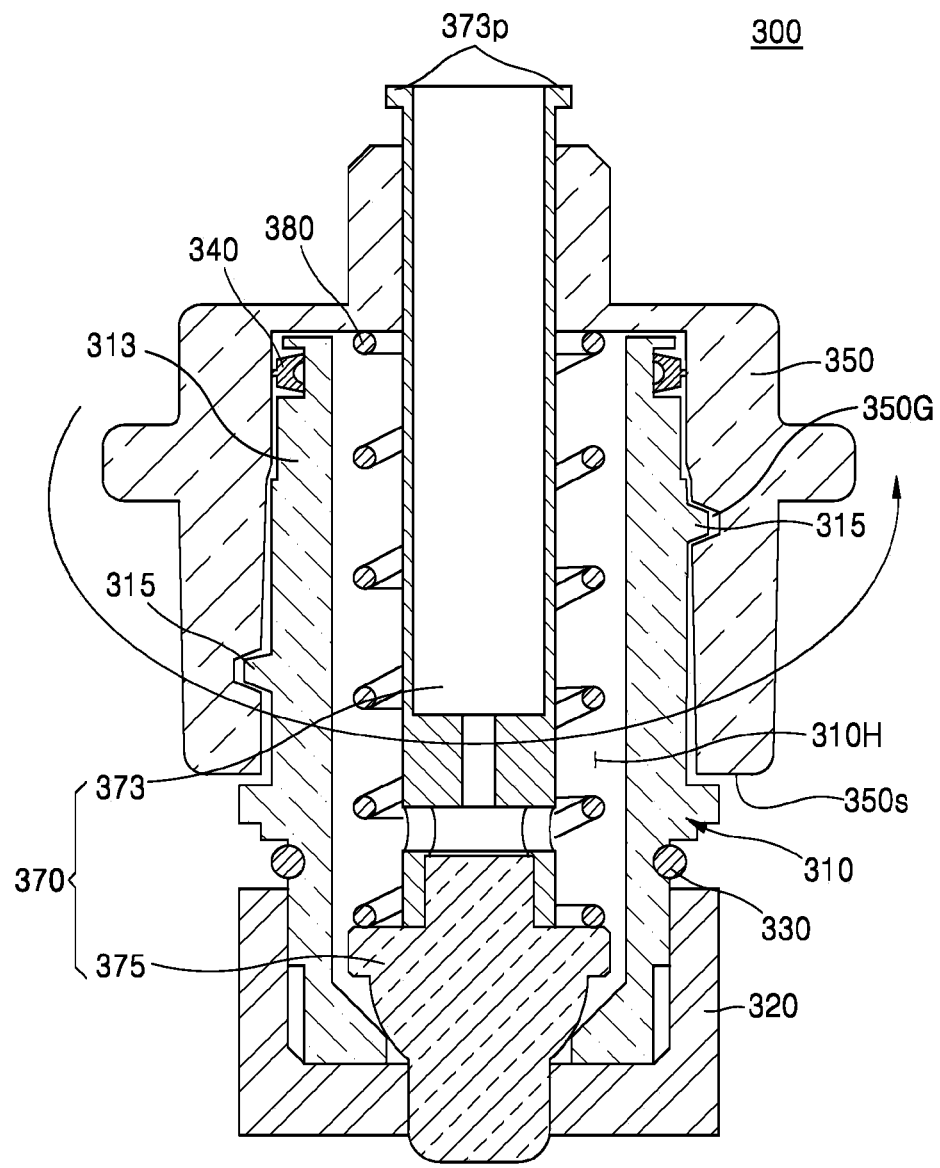
FIG. 4 is a cross-sectional view of the steam discharge structure according to an exemplary embodiment of the present disclosure.

Referring to FIGS. 3 and 4 together, the steam discharge structure 300 may include a post 310, a coupling member 320, a first packing 330, a second packing 340, a moving member 350, a steam blocking member 370, an elastic member 380, and the like.

Figure 11:
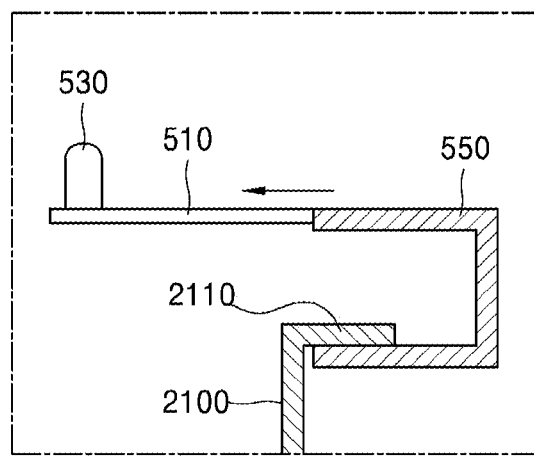
FIGS. 11 and 12 are cross-sectional views illustrating operations of the locking structure based on the rotation of a rotating cover.

The post 310 may include a steam discharge passage 310H connected to the cooking space of the inner pot (2100 in FIG. 11). In an exemplary embodiment, the steam discharge passage 310H in the post 310 may provide a discharge path for steam generated in the cooking space of the inner pot 2100 during cooking.

In an exemplary embodiment, the post 310 may include a body 313 and a rotating protrusion 315. The body 313 may extend in a first direction (i.e., a direction perpendicular to the direction in which the top surface of the top plate 110 extends), and may include a steam discharge passage 310H therein. For example, the body 313 may have a hollow cylindrical shape.

The rotating protrusion 315 may protrude from the side surface of the body 313 and extend in an oblique direction. In addition, the rotating protrusion 315 may be received in a receiving groove 350G in the moving member 350 which will be described later and may be configured to rotate the moving member 350.

The coupling member 320 may be configured to couple the post 310 onto the top plate 110. In an exemplary embodiment, the upper portion of the coupling member 320 may be coupled with the post 310, and the lower portion of the coupling member 320 may be coupled with the top plate 110. In addition, since the central portion of the coupling member 320 may be empty, the coupling member 320 may connect the cooking space of the inner pot 2100 to the steam discharge passage 310H in the post 310.

The moving member 350 may be disposed on the upper portion of the post 310 to surround a portion of the post 310 and may be configured to move in the first direction perpendicular to the direction in which the top surface of the top plate 110 extends.

In an exemplary embodiment, the moving member 350 may be configured to move in the first direction along the side surface of the top plate 110 while rotating about a rotation axis extending in the first direction. For example, when the moving member 350 rotates in a first rotating direction, the moving member 350 may move in a direction away from the top plate 110. In addition, when the moving member 350 rotates in a second rotating direction opposite to the first rotating direction, the moving member 350 may move in a direction toward the top plate 110.

In an exemplary embodiment, a portion of the moving member 350 may be exposed from an outer pot lid 1200 which will be described later. Accordingly, the portion of the moving member 350 exposed from the outer pot lid 1200 may be held and rotated by a user.

In an exemplary embodiment, the moving member 350 may have a receiving groove 350G which receives the rotating protrusion 315 of the post 310. Since the moving member 350 may include the receiving groove 350G which receives the rotating protrusion 315, the moving member 350 may be configured to move in the first direction based on the rotating movement using the rotating protrusion 315 of the post 310.

In an exemplary embodiment, as the moving member 350 moves in the first direction based on the rotating movement, the degree of compression of the elastic member 380 disposed between the moving member 350 and the steam blocking member 370 may be controlled.

In other words, the magnitude of a force applied to an inner surface of the post 310, which forms the steam discharge passage 310H, by a blocking cap 375 of the steam blocking member 370 may be controlled based on an amount of the rotation of the moving member 350.

In an exemplary embodiment, in the case where the steam blocking member 370 blocks the steam discharge passage 310H with a force having a first magnitude, when the magnitude of the total pressure provided to the steam blocking member 370 due to the steam generated in the cooking space of the inner pot 2100 is greater than the first magnitude, the steam blocking member 370 may move upward so that the steam discharge passage 310H can be opened.

In addition, in the case where the steam blocking member 370 blocks the steam discharge passage 310H with a force having a second magnitude greater than the first magnitude, when the magnitude of the total pressure provided to the steam blocking member 370 due to the steam generated in the cooking space of the inner pot 2100 is greater than the second magnitude, the steam blocking member 370 may move upward so that the steam discharge passage 310H can be opened. For example, when the magnitude of the total pressure of steam generated in the cooking space of the inner pot 2100 and provided to the steam blocking member 370 is the first magnitude, the steam blocking member 370 is capable of continuously blocking the steam discharge passage 310H.

In an exemplary embodiment, when the moving member 350 rotates in the first rotating direction and moves in the direction away from the top plate 110, the elastic member 380 may be stretched.

In addition, when the moving member 350 rotates in the second rotating direction opposite to the first rotating direction and moves in the direction toward the top plate 110, the elastic member 380 may be contracted.

In an exemplary embodiment, when the moving member 350 continuously rotates in the first rotating direction and moves away from the top plate 110 in excess of a predetermined distance, the moving member 350 may apply an external force to the moving protrusion 373p to move the steam blocking member 370 in the first direction. When the steam blocking member 370 moves in the first direction via the moving member 350, the steam blocking member 370 may open the steam discharge passage 310H.

The steam blocking member 370 may be disposed within the steam discharge passage 310H in the post 310 through a portion of the moving member 350. In addition, the steam blocking member 370 may open or block the steam discharge passage 310H by moving in the first direction based on the rotation of the moving member 350.

In an exemplary embodiment, the steam blocking member 370 may include a piston 373 and a blocking cap 375. In an exemplary embodiment, the piston 373 may be disposed within the steam discharge passage 310H in the post 310 through a portion of the moving member 350.

In an exemplary embodiment, the piston 373 may be disposed in the upper portion of the moving member 350 and may include a moving protrusion 373p overlapping a portion of the moving member 350 in a vertical direction.

For example, when the moving member 350 moves upward and pushes the moving protrusion 373p of the piston 373 upward, the blocking cap 375 of the steam blocking member 370 may open the steam discharge passage 310H.

In addition, when the moving member 350 is spaced apart from the moving protrusion 373p of the piston 373, the blocking cap 375 of the steam blocking member 370 may block the steam discharge passage 310H.

In an exemplary embodiment, the blocking cap 375 may be coupled to the lower portion of the piston 373 and may be configured to block the steam discharge passage 310H. For example, when viewed in a cross section of the steam discharge structure 300, the length of the blocking cap 375 in the horizontal direction may be greater than the length of the piston 373 in the horizontal direction.

Accordingly, a portion of the top surface of the blocking cap 375 may provide a space in which the elastic member 380 is disposed within the steam discharge passage 310H. For example, the elastic member 380 may be interposed between the top surface of the blocking cap 375 and the bottom surface of the moving member 350 to surround the side portion of the piston 373.

In addition, the blocking cap 375 may include a silicone rubber or synthetic rubber. However, the material of the blocking cap 375 is not limited thereto.

The elastic member 380 may be configured to provide an elastic force in the first direction to the steam blocking member 370 based on the movement of the moving member 350. In an exemplary embodiment, the elastic member 380 may be a coil spring that is disposed on the blocking cap 375 of the steam blocking member 370 and surrounds the side portion of the piston 373.

In an exemplary embodiment, as the moving member 350 moves in the first direction based on the rotating movement thereof, the degree of compression of the elastic member 380 disposed between the moving member 350 and the steam blocking member 370 may be controlled.

For example, when the moving member 350 rotates in the first rotating direction and moves in the direction away from the top plate 110, the elastic member 380 may be stretched.

In addition, when the moving member 350 rotates in the second rotating direction opposite to the first rotating direction and moves in the direction toward the top plate 110, the elastic member 380 may be contracted. When the elastic member 380 is contracted, the elastic member 380 may provide a downward elastic force to the blocking cap 375 of the steam blocking member 370.

In an exemplary embodiment, the first packing 330 may be disposed between the coupling member 320 and the moving member 350 to surround a portion of a side surface of the post 310. In addition, the second packing 340 may be disposed inside the moving member 350 to surround a portion of the side surface of the post 310. The first packing 330 and the second packing 340 may include a synthetic rubber or silicone rubber.

FIGS. 5 to 8 are cross-sectional views of the steam discharge structure 300 operating in the first to fourth pressure modes.

Figure 5:
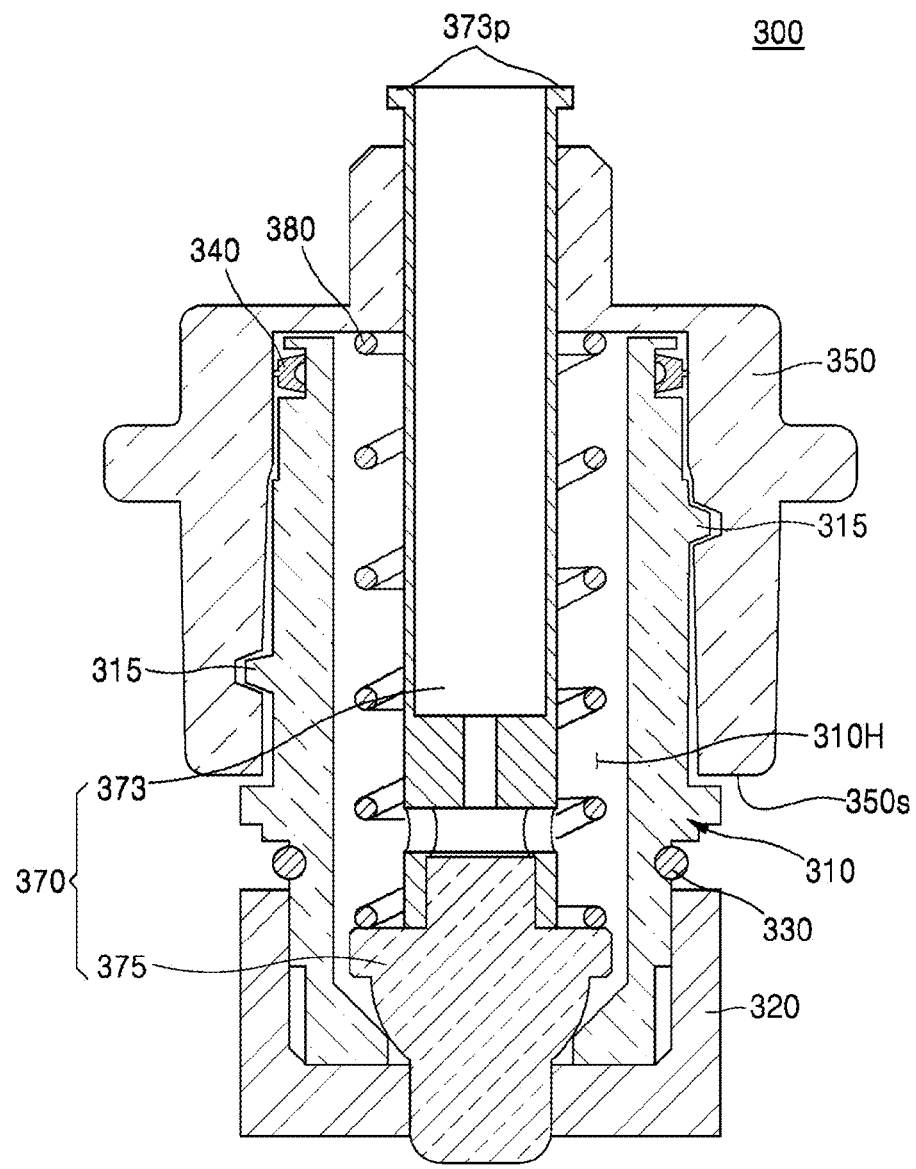
FIG. 5 is a cross-sectional view of the steam discharge structure operating in a first pressure mode.

FIG. 5 is a cross-sectional view of the steam discharge structure 300 operating in the first pressure mode.

Referring to FIG. 5, when the steam discharge structure 300 of the cooking device 10 operates in the first pressure mode, the bottom surface 350s of the moving member 350 may be located at a first level. The level of the bottom surface 350s of the moving member 350 may be defined as a height formed by the bottom surface 350s of the moving member 350 from the top surface of the top plate 110 in the first direction.

When the steam discharge structure 300 operates in the first pressure mode, the elastic member 380 of the steam discharge structure 300 may provide a first elastic force to the blocking cap 375 of the steam blocking member 370.

In an exemplary embodiment, when the steam discharge structure 300 operates in the first pressure mode, the maximum pressure formed inside the inner pot 2100 during cooking may be a first pressure.

The first pressure may be a pressure formed by the steam inside the inner pot 2100 when the steam blocking member 370 starts to move upward due to the total pressure applied by the steam of the inner pot 2100 to the steam blocking member 370. For example, the first pressure may be about 2.1 kgf/cm$^2$. However, the intensity of the first pressure is not limited to thereto.

When the pressure of the steam generated in the course of cooking process does not exceed the first pressure while the steam discharge structure 300 operates in the first pressure mode, the steam discharge structure 300 may not discharge the steam inside the inner pot 2100 to the exterior of the cooking device 10.

In addition, when the pressure inside the inner pot 2100 exceeds the first pressure in the course of cooking, the steam blocking member 370 of the steam discharge structure 300 may open the steam discharge passage 310H in the post 310. Accordingly, the steam discharge structure 300 may discharge the steam inside the inner pot 2100 to the exterior of the cooking device 10.

Figure 6:
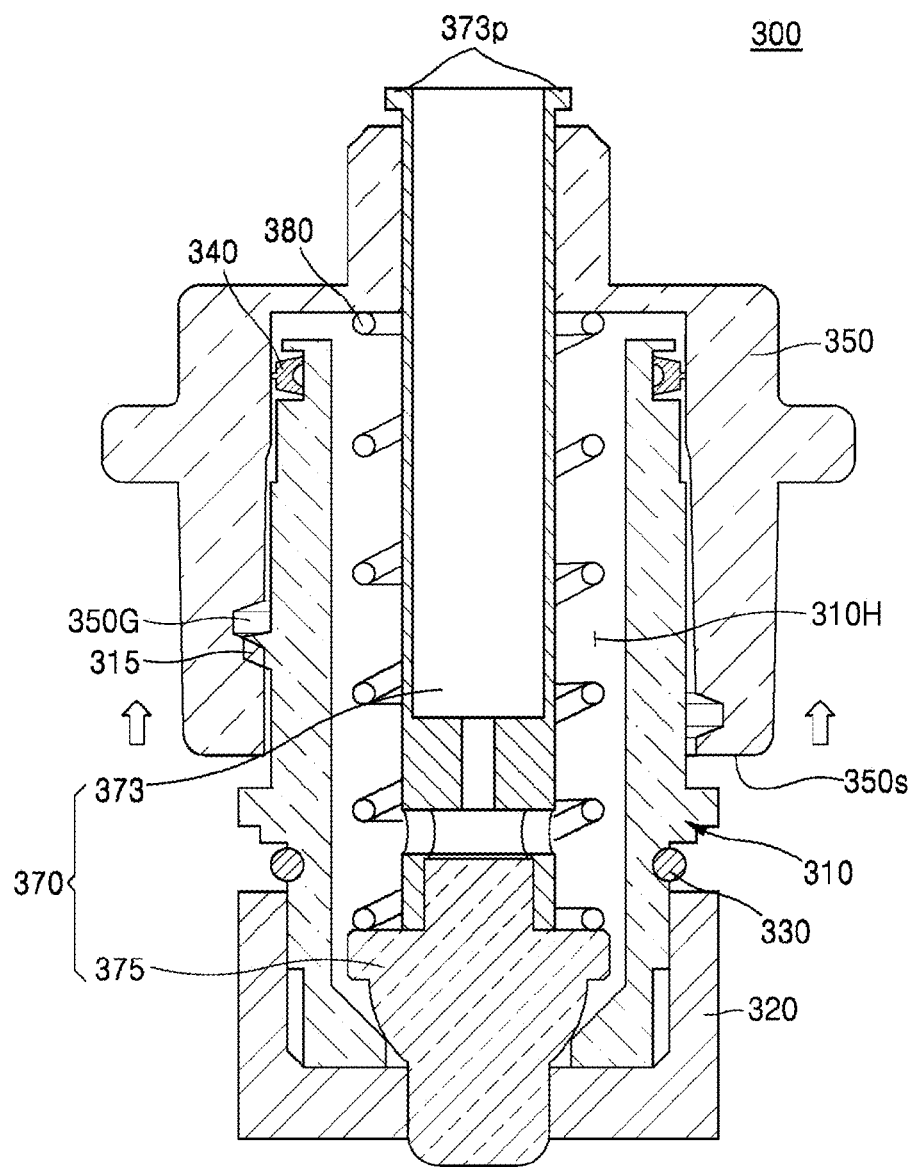
FIG. 6 is a cross-sectional view of the steam discharge structure operating in a second pressure mode.

FIG. 6 is a cross-sectional view of the steam discharge structure 300 operating in the second pressure mode.

Referring to FIG. 6, when the steam discharge structure 300 of the cooking device 10 operates in the second pressure mode, the bottom surface 350s of the moving member 350 may be located at a second level higher than the first level.

In an exemplary embodiment, the moving member 350 may move from the first level to the second level based on the rotating movement using the rotating protrusion 315 of the post 310. For example, a portion of the moving member 350 exposed from the outer pot lid 1200 may be rotated by a user, and the moving member 350 may move from the first level to the second level based on the rotating movement.

When the steam discharge structure 300 operates in the second pressure mode, the elastic member 380 of the steam discharge structure 300 may provide a second elastic force smaller than the first elastic force to the blocking cap 375 of the steam blocking member 370.

In an exemplary embodiment, when the steam discharge structure 300 operates in the second pressure mode, the maximum pressure formed inside the inner pot 2100 during cooking may be a second pressure lower than the first pressure.

The second pressure may be a pressure formed by the steam inside the inner pot 2100 when the steam blocking member 370 starts to move upward due to the total pressure applied by the steam of the inner pot 2100 to the steam blocking member 370. For example, the second pressure may be about 1.5 kgf/cm$^2$. However, the intensity of the second pressure is not limited thereto.

When the pressure of the steam generated in the course of cooking process does not exceed the second pressure while the steam discharge structure 300 operates in the second pressure mode, the steam discharge structure 300 may not discharge the steam inside the inner pot 2100 to the exterior of the cooking device 10.

In addition, when the pressure inside the inner pot 2100 exceeds the second pressure in the course of cooking, the steam blocking member 370 of the steam discharge structure 300 may open the steam discharge passage 310H in the post 310. Accordingly, the steam discharge structure 300 may discharge the steam inside the inner pot 2100 to the exterior of the cooking device 10.

Figure 7:
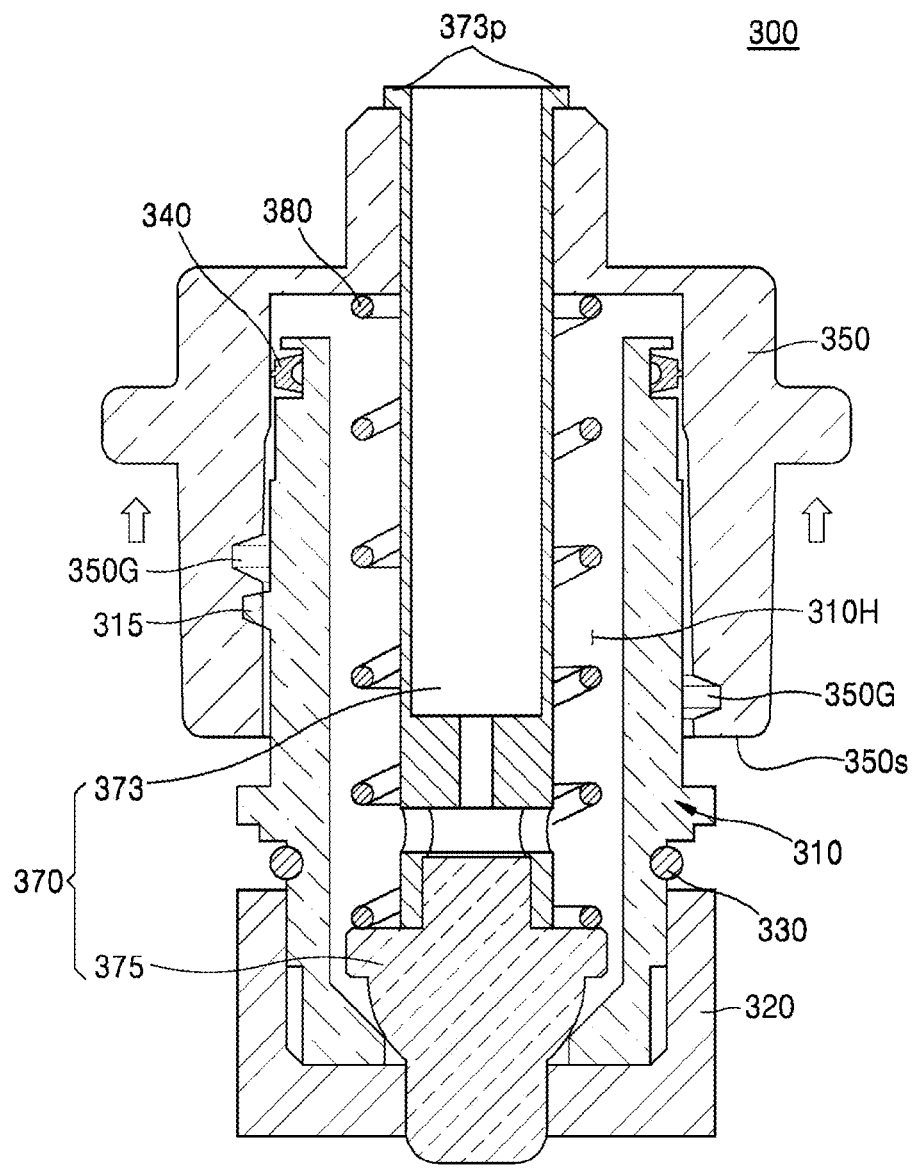
FIG. 7 is a cross-sectional view of the steam discharge structure operating in a third pressure mode.

FIG. 7 is a cross-sectional view of the steam discharge structure 300 operating in the third pressure mode.

Referring to FIG. 7, when the steam discharge structure 300 of the cooking device 10 operates in the third pressure mode, the bottom surface 350s of the moving member 350 may be located at a third level higher than the second level.

In an exemplary embodiment, the moving member 350 may move from the second level to the third level based on the rotating movement using the rotating protrusion 315 of the post 310. For example, a portion of the moving member 350 exposed from the outer pot lid 1200 may be rotated by a user, and the moving member 350 moves from the second level to the third level based on the rotating movement.

When the steam discharge structure 300 operates in the third pressure mode, the elastic member 380 of the steam discharge structure 300 may provide a third elastic force smaller than the second elastic force to the blocking cap 375 of the steam blocking member 370.

In an exemplary embodiment, when the steam discharge structure 300 operates in the third pressure mode, the maximum pressure formed inside the inner pot 2100 during cooking may be a third pressure lower than the second pressure.

The third pressure may be a pressure formed by the steam inside the inner pot 2100 when the steam blocking member 370 starts to move upward due to the total pressure applied by the steam of the inner pot 2100 to the steam blocking member 370. For example, the third pressure may be about 1.2 kgf/cm$^2$. However, the intensity of the third pressure is not limited thereto.

When the pressure of the steam generated in the course of cooking process does not exceed the third pressure while the steam discharge structure 300 operates in the third pressure mode, the steam discharge structure 300 may not discharge the steam inside the inner pot 2100 to the exterior of the cooking device 10.

In addition, when the pressure inside the inner pot 2100 exceeds the third pressure in the course of cooking, the steam blocking member 370 of the steam discharge structure 300 may open the steam discharge passage 310H in the post 310. Accordingly, the steam discharge structure 300 may discharge the steam inside the inner pot 2100 to the exterior of the cooking device 10.

Figure 8:
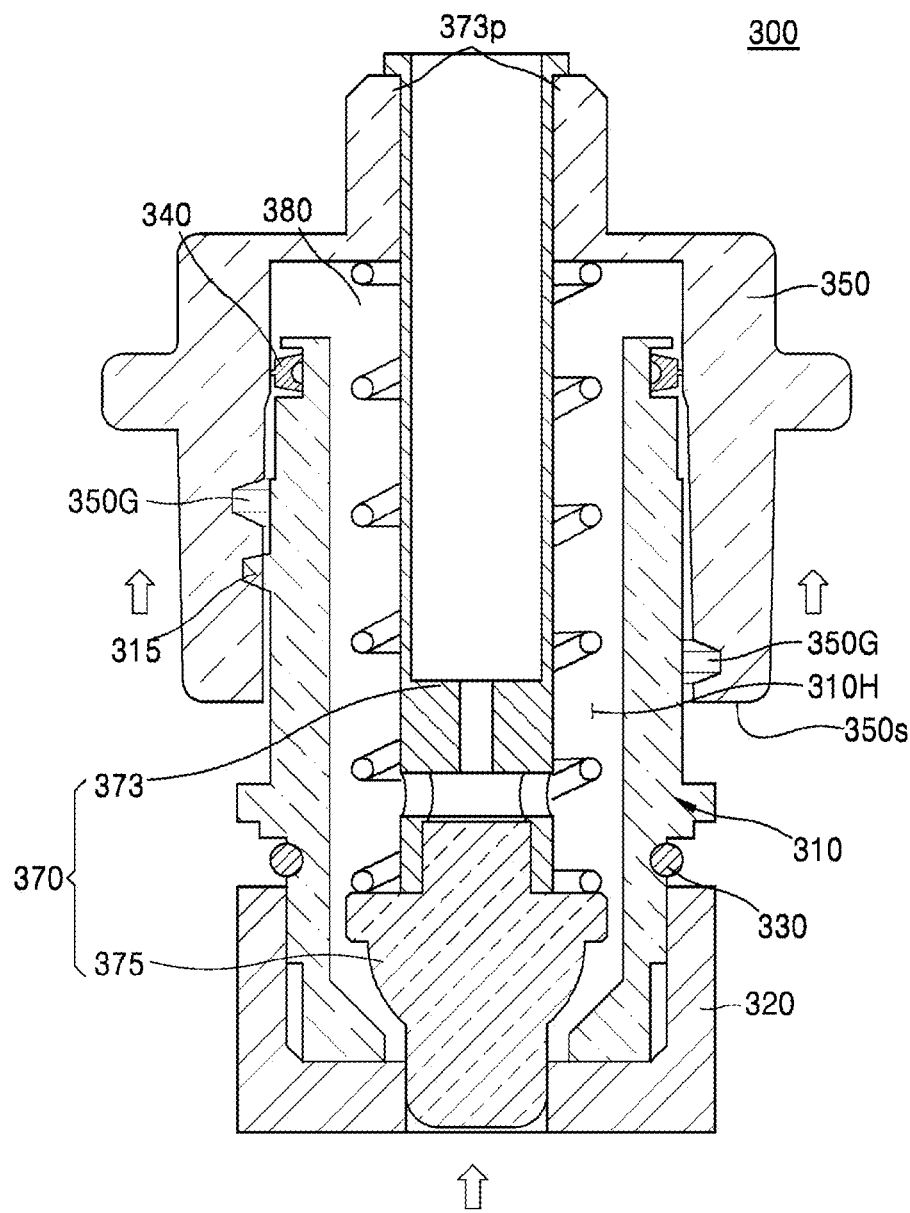
FIG. 8 is a cross-sectional view of the steam discharge structure operating in a fourth pressure mode.

FIG. 8 is a cross-sectional view of the steam discharge structure 300 operating in the fourth pressure mode.

Referring to FIG. 8, when the steam discharge structure 300 of the cooking device 10 operates in the fourth pressure mode, the bottom surface 350s of the moving member 350 may be located at a fourth level higher than the third level.

In an exemplary embodiment, the moving member 350 may move from the third level to the fourth level based on the rotating movement using the rotating protrusion 315 of the post 310. For example, a portion of the moving member 350 exposed from the outer pot lid 1200 may be rotated by a user, and the moving member 350 moves from the third level to the fourth level based on the rotating movement.

When the steam discharge structure 300 operates in the fourth pressure mode, the moving member 350 of the steam discharge structure 300 may push the moving protrusion 373p of the piston 373 upward. Accordingly, the blocking cap 375 of the moving member 350 may open the steam discharge passage 310H in the post 310.

In an exemplary embodiment, when the steam discharge structure 300 operates in the fourth pressure mode, the maximum pressure formed inside the inner pot 2100 during cooking may be a fourth pressure. For example, the fourth pressure may be about 1.0 kgf/cm$^4$.

In other words, when the cooking device 10 operates in the fourth pressure mode, the cooking device 10 may cook food ingredients in the cooking space of the inner pot 2100 in a state in which the steam discharge passage 310H of the steam discharge structure 300 is open. In other words, the cooking device 10 may cook food ingredients in the atmospheric pressure state (i.e., a non-pressure mode).

Figure 9:
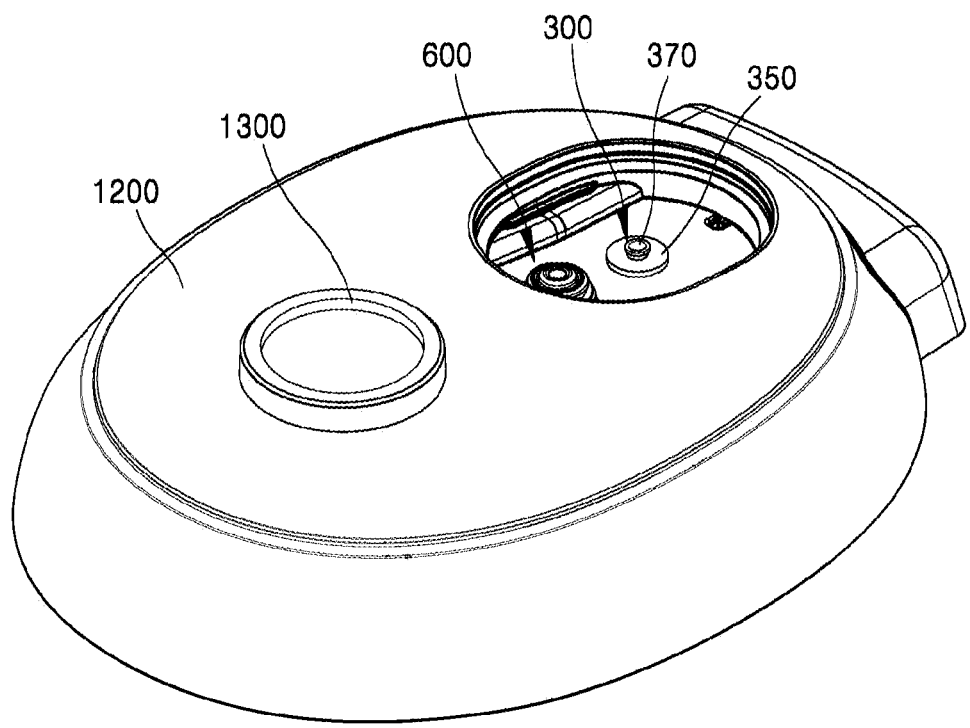
FIG. 9 is a view illustrating a portion of the cooking device according to an exemplary embodiment of the present disclosure.

FIG. 9 is a view illustrating a portion of the cooking device 10 according to an exemplary embodiment of the present disclosure.

In an exemplary embodiment, the cooking device 10 may further include an outer pot lid 1200 which covers an upper portion of the top plate 110. The outer pot lid 1200 may expose the steam discharge structure 300 and the solenoid valve 600 to the outside of the cooking device 10.

In an exemplary embodiment, the outer pot lid 1200 may expose a portion of the moving member 350 of the steam discharge structure 300. The portion of the moving member 350 exposed by the outer pot lid 1200 may be held and rotated by a user.

The cooking device 10 may further include a handle 1300 coupled with the rotating cover 400. In an exemplary embodiment, the handle 1300 may be configured to rotate the rotating cover 400.

In an exemplary embodiment, the locking structure 500 may be configured to slide based on the rotating movement of the handle 1300. For example, when the locking protrusion 530 of the locking structure 500 is disposed inside the first guide hole H_G1 in the rotating cover 400 by the rotation of the handle 1300, the locking hook 550 of the locking structure 500 may be coupled with the inner pot cover 210. In addition, when the locking protrusion 530 of the locking structure 500 is disposed inside the second guide hole H_G2 in the rotating cover 400 by the rotation of the handle 1300, the locking hook 550 of the locking structure 500 may be separated from the inner pot cover 210.

Figure 10:
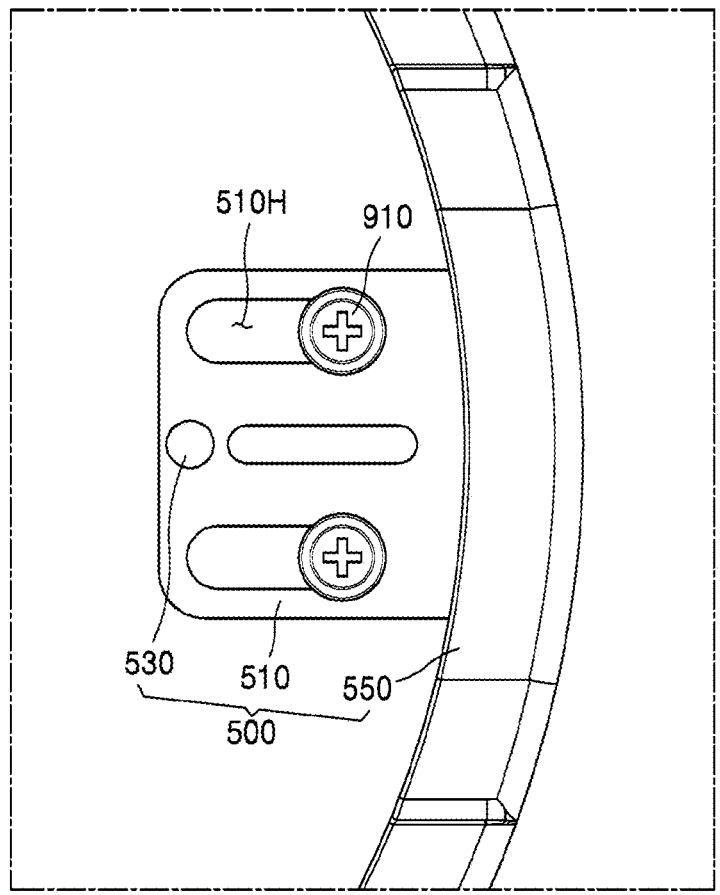
FIG. 10 is a plan view of a locking structure according to an exemplary embodiment of the present disclosure.
Figure 12:
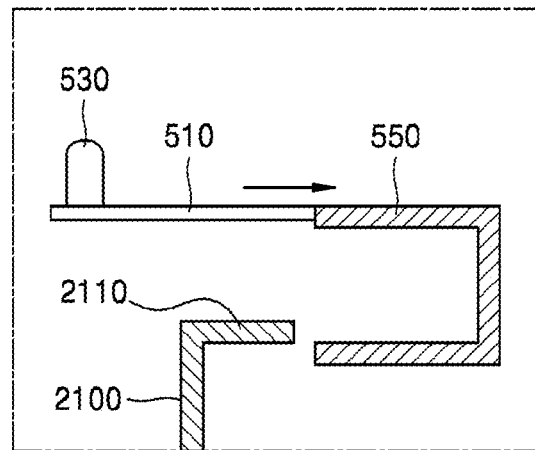
Figure 13:
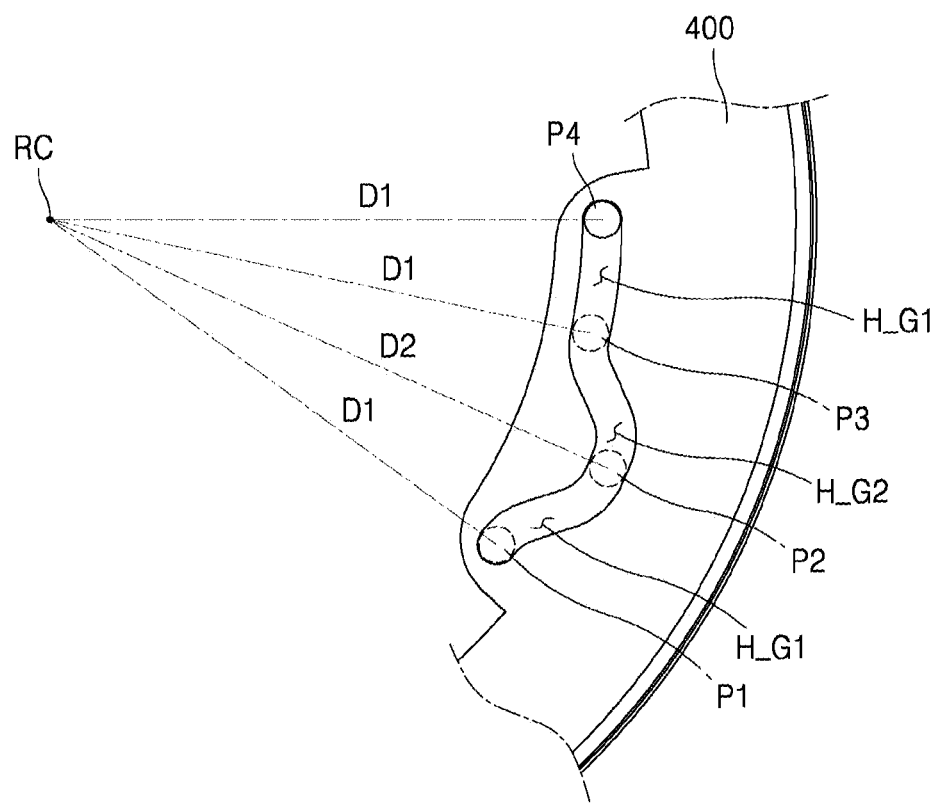
FIG. 13 is a plan view illustrating a portion of the rotating cover according to an exemplary embodiment of the present disclosure.

FIG. 10 is a plan view of the locking structure 500 according to an exemplary embodiment of the present disclosure. FIGS. 11 and 12 are cross-sectional views illustrating the operation of the locking structure 500 based on the rotation of the rotating cover 400. FIG. 13 is a plan view illustrating a portion of the rotating cover 400 according to an exemplary embodiment of the present disclosure.

Referring to FIGS. 10 to 13, the locking structure 500 may include a locking plate 510, a locking protrusion 530, and a locking hook 550.

In an exemplary embodiment, the locking hook 550 may extend along the edge of the top plate 110 and have a curved shape in a plan view. In addition, the locking hook 550 may be configured to be engaged with and fixed to the flange 2110 of the inner pot 2100.

The locking guide hole 510H in the locking plate 510 may guide the sliding movement of the locking plate 510 and may limit the movement range of the locking plate 510. For example, the locking guide member 910, such as a screw, may be coupled to the top plate 110 by passing through the locking guide hole 510H in the locking plate 510.

In exemplary embodiments, the rotating cover 400 may include a first guide hole H_G1 spaced apart from the rotation center RC by a first distance, and a second guide hole H_G2 spaced apart from the rotation center RC by a second distance greater than the first distance.

For example, the first guide hole H_G1 may include a first position P1, a third position P3, and a fourth position P4, which are spaced apart from the rotation center RC by the first distance D1. In addition, the second guide hole H_G2 may include a second position P2 spaced apart from the rotation center RC by the second distance D2.

Depending on the rotating angle of the rotating cover 400, the relative position of the locking protrusion 530 of the locking structure 500 with respect to the first guide hole H_G1 and the second guide hole H_G2 in the rotating cover 400 may change.

In an exemplary embodiment, when the locking protrusion 530 of the locking structure 500 is located at the first position P1, the third position P3, and the fourth position P4, which are spaced from the rotation center RC of the rotating cover 400 by substantially the same distance D1, in the first guide hole H_G1, the locking hook 550 of the locking structure 500 may be engaged with the flange 2110 of the inner pot 2100. In addition, the locking hook 550 may be coupled to a portion of the inner pot cover 210.

In addition, when the locking protrusion 530 of the locking structure 500 is located at the second position P2, which is spaced apart from the rotation center RC of the rotating cover 400 by the second distance D2, in the second guide hole H_G2, the locking hook 550 of the locking structure 500 may be separated from the flange 2110 of the inner pot 2100. In addition, the locking hook 550 may be separated from a portion of the inner pot cover 210.

In other words, while the locking protrusion 530 of the locking structure 500 is moving from the first position P1 of the first guide hole H_G1 toward the second position P2 of the second guide hole H_G2 and while the locking protrusion 530 of the locking structure 500 is moving from the third position P3 of the first guide hole H_G1 toward the second position P2 of the second guide hole H_G2, the locking hook 550 of the locking structure 570 will move outward in the radial direction.

Conversely, while the locking protrusion 530 of the locking structure 500 is moving from the second position P2 of the second guide hole H_G2 toward the first position P1 of the first guide hole H_G1 and while the locking protrusion 530 of the locking structure 500 is moving from the second position P2 of the second guide hole H_G2 toward the third position P3 of the first guide hole H_G1, the locking hook 550 of the locking structure 570 will move inward in the radial direction.

The technical idea of the present disclosure described in the foregoing is not limited to the above-described embodiments and the accompanying drawings. In addition, it will be obvious to a person of ordinary skill in the art to which the present disclosure pertains that various substitutions, modifications, and changes are possible without departing from the scope of the technical spirit of the present disclosure.

What is claimed is:

1. A cooking device comprising:
    a top plate configured to cover an inner pot; and
    a steam discharge structure comprising:
      a post comprising a steam discharge passage connected to interior of the inner pot;
      a moving member disposed on the post to surround at least a portion of a side surface of the post, and configured to move in a first direction which is perpendicular to a direction in which a top surface of the top plate extends by a user's manipulation;

a steam blocking member disposed within the steam discharge passage through a portion of the moving member, and configured to open/close the steam discharge passage based on a movement of the steam blocking member in the first direction; and an elastic member configured to provide an elastic force to the steam blocking member, wherein the steam blocking member comprises:

a piston passing through the moving member to be disposed in the steam discharge passage, and including a moving protrusion disposed at an upper portion protruding from the moving member; and a blocking cap coupled to a lower portion of the piston, and configured to block the steam discharge passage, wherein the moving member is configured to move between a first level and a second level which is a level that has moved from the first level in the first direction, wherein the blocking cap is configured to block the steam discharge passage with an elastic force provided by the elastic member when the moving member is in the first level, wherein, while the moving member moves from the first level to the second level by the user's manipulation, the moving member moves the moving protrusion of the piston such that the blocking cap opens the steam discharge passage, wherein a degree of compression of the elastic member is controlled by a movement of the moving member in the first direction with respect to the post, thereby controlling a magnitude of the elastic force provided to the steam blocking member, and wherein the post includes a body and a rotating protrusion protruding from the side surface of the body and extending in an oblique direction, and the moving member includes a receiving groove configured to receive the rotating protrusion.

2. The cooking device of claim 1, wherein the moving member is configured to move in the first direction based on rotation about a rotation axis extending in the first direction.

3. The cooking device of claim 2, wherein:
the body extends in the first direction and comprises the steam discharge passage therein.

4. The cooking device of claim 1, wherein the elastic member is disposed between the moving member and the blocking cap to surround the piston.

5. The cooking device of claim 1, further comprising:
a rotating cover coupled to the top plate to be rotatable along an edge of the top plate, and comprising a first guide hole spaced apart from a rotation center of the rotating cover by a first distance, and a second guide hole spaced apart from the rotation center by a second distance greater than the first distance; and a locking structure configured to be engaged with a flange of the inner pot based on a rotation of the rotating cover.

6. The cooking device of claim 5, wherein the locking structure comprises:

a locking plate configured to move in a second direction parallel to the direction in which the top surface of the top plate extends and perpendicular to the first direction;

a locking protrusion protruding from a surface of the locking plate and disposed inside the first guide hole and the second guide hole of the rotating cover; and a locking hook coupled to one side of the locking plate wherein the locking hook is configured to be coupled to or separated from the flange of the inner pot based on the rotation of the rotating cover.

7. The cooking device of claim 6, wherein, when the locking protrusion is disposed inside the first guide hole, the locking hook is coupled to the flange of the inner pot, and wherein, when the locking protrusion is disposed inside the second guide hole, the locking hook is separated from the flange of the inner pot.

8. A cooking device comprising:
a top plate configured to cover an inner pot;
a steam discharge structure comprising:
a post comprising a steam discharge passage connected to interior of the inner pot;
a moving member disposed on the post to surround at least a portion of a side surface of the post, and configured to move, based on a rotation of the moving member, in a first direction which is perpendicular to a direction in which a top surface of the top plate extends by a user's manipulation;

a steam blocking member passing through a portion of the moving member, and configured to open/close the steam discharge passage based on a movement of the steam blocking member in the first direction; and an elastic member configured to provide an elastic force to the steam blocking member;

a rotating cover coupled onto the top plate to be rotatable along an edge of the top plate, and comprising a first guide hole spaced apart from a rotation center of the rotating cover by a first distance, and a second guide hole spaced apart from the rotation center by a second distance greater than the first distance; and a locking structure comprising a locking protrusion disposed inside the first guide hole and the second guide hole in the rotating cover, and configured to move in a second direction parallel to the direction in which the top surface of the top plate extends to be coupled to or separated from the inner pot based on a rotation of the rotating cover, wherein the steam blocking member comprises:
a piston passing through the moving member to be disposed in the steam discharge passage, and including a moving protrusion disposed at an upper portion protruding from the moving member; and a blocking cap coupled to a lower portion of the piston, and configured to block the steam discharge passage, wherein the moving member is configured to move between a first level, a second level higher than the first level, a third level higher than the second level, and a fourth level higher than the third level, wherein the blocking cap is configured to block the steam discharge passage with a first elastic force provided by the elastic member when the moving member is in the first level, wherein the blocking cap is configured to block the steam discharge passage with a second elastic force smaller than the first elastic force, provided by the elastic member when the moving member is in the second level, wherein the blocking cap is configured to block the steam discharge passage with a third elastic force smaller than the second elastic force, provided by the elastic member when the moving member is in the third level, and wherein, while the moving member moves from the third level to the fourth level by the user's manipulation, the moving member moves the moving protrusion of the piston such that the blocking cap opens the steam discharge passage, wherein a degree of compression of the elastic member is controlled by a movement of the moving member in the first direction with respect to the post, thereby controlling a magnitude of the elastic force provided to the steam blocking member, and wherein the post includes a body and a rotating protrusion protruding from the side surface of the body and extending in an oblique direction, and the moving member includes a receiving groove configured to receive the rotating protrusion.

\* \* \* \* \*